(12) United States Patent
Mugler et al.

(10) Patent No.: US 7,130,764 B2
(45) Date of Patent: Oct. 31, 2006

(54) ROBUST DSP INTEGRATOR FOR ACCELEROMETER SIGNALS

(75) Inventors: Dale H. Mugler, Hudson, OH (US); Yan Wu, Statesboro, GA (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 10/818,182

(22) Filed: Apr. 5, 2004

(65) Prior Publication Data

US 2004/0243346 A1   Dec. 2, 2004

Related U.S. Application Data

(60) Provisional application No. 60/460,564, filed on Apr. 5, 2003.

(51) Int. Cl.
*G06F 11/30* (2006.01)
*G06F 15/00* (2006.01)
*G21C 17/00* (2006.01)

(52) U.S. Cl. ..................................................... 702/182

(58) Field of Classification Search ................ 702/182, 702/150; 700/44
See application file for complete search history.

(56) References Cited

U.S. PATENT DOCUMENTS

| 4,984,464 A | 1/1991 | Thomas et al. |
| 5,646,350 A | 7/1997 | Robinson et al. |
| 6,314,327 B1 * | 11/2001 | Mugler et al. ................ 700/44 |
| 6,912,475 B1 * | 6/2005 | Moriya et al. ............... 702/150 |

FOREIGN PATENT DOCUMENTS

WO    WO 88/07461    10/1988

OTHER PUBLICATIONS

Rainville, Earl D, A Short Course in Differential Sixth Edition, Macmillan Publishing Co., Inc., pp. 45-46.*
"An Integrator for Time-Dependent Systems with Oscillatory Behavior", by Dale H. Mugler et al., Comput. Methods Appl. Mech. Engrg. 171 (1999), pp. 25-41.
"Compression Depth Estimation for CPR Quality Assessment Using DSP on . . . ", by Sven Aase et al., IEEE Trans. on Biomed. Engin, vol. 49, No. 3, Mar. 2002, pp. 263-268.
"A Robust DSP Integrator for Accelerometer Signals", by Yan Wu et al., IEEE Trans. on Biomed. Engin, vol. 51, No. 2, Feb. 2004, pp. 385-389.

* cited by examiner

*Primary Examiner*—Bryan Bui
*Assistant Examiner*—Sujoy Kundu
(74) *Attorney, Agent, or Firm*—Roetzel & Andress; George W. Moxon, II (57) ABSTRACT

A system and method for determining a predicted value of a function from at least one previous value of said function and at least one second-derivative value of the function. The system includes a sensor provided to sense a second-derivative value of the function and transmit an oscillatory signal representing the sensed second-derivative value, a computer-readable memory in communication with the sensor to store the previous value of the function and the second-derivative value, and a feature for computing the predicted value of the function using an integration algorithm including a coefficient of integration that is dependant upon at least a frequency of the signal.

17 Claims, 5 Drawing Sheets

ROBUST DSP INTEGRATOR FOR ACCELEROMETER SIGNALS

RELATED APPLICATIONS

This application claims the benefit of U.S. Provisional Application No. 60/460,564 filed Apr. 5, 2003.

FIELD OF THE INVENTION

The invention relates generally to data processing methods and devices, and more particularly to the minimization of error introduced into the calculation of a predicted position from acceleration samples and past position samples.

BACKGROUND OF THE INVENTION

Recently, attempts have been made to develop a robust method and system for predicting a function value from function values occurring earlier in time and second-derivative values of the function. Implementation of such a method and system can be illustrated as the prediction of current and future position values of an object based on previously determined position values along with current and past acceleration values. For example, S. O. Aase et al., "Compression Depth Estimation for CPR Quality Assessment Using DSP on Accelerometer Signals," *IEEE Trans. Biomed. Eng.*, vol. 49, pp. 263–268, March 2002., (hereinafter referred to as "Aase et al."), incorporated herein by reference, describes the efforts of the authors to apply accelerometers to a mannequin in order to estimate chest movement using digital signal processing techniques on accelerometer signals. Aase et al. desired to provide a "practical, robust, and reliable solution for estimating chest compression depth."

The proposed method of Aase et al. for estimating position from digital accelerometer data turned out to be unstable. The authors first estimated the digital velocity by using the trapezoidal rule, a classic Newton-Cotes polynomial-based numerical integration technique, to integrate accelerometer readings a(t) according to the following expression:

$$v(t) = \int_0^t a(\tau)d\tau + v(t_0) \quad (1)$$

where $t=nT$ and $t_0=(n-1)T$, t is a time value, n is an integer, and T is the sampling interval. Applying the trapezoidal rule to perform the integration shown in (1) and converting the result from the analog time domain to the digital time domain produces an equation of the form:

$$v[n] = \frac{T}{2}(a[n] + a[n-1]) + v[n-1]$$

From the perspective of a DSP approach utilizing the z-transform, this operation can be viewed as a digital filtering operation employing a transfer function H(z) expressed as:

$$H(z) = \frac{T}{2}\frac{1+z^{-1}}{1-z^{-1}}$$

Thus, the z-transform of the velocity function was found from the z-transform of the acceleration by multiplying the z-transform of the acceleration function by the transfer function H(z). Similarly, to arrive at the position function, the authors simply performed this operation a second time according to the equation $X(z)=(H(z))^2 A(z)$. The position function obtained in this manner and expressed in the digital time domain is:

$$x[n] = 2x[n-1] - x[n-2] + \left(\frac{T}{2}\right)^2 (a[n] + 2a[n-1] + a[n-2]) \quad (2)$$

Although difference equation (2) could be implemented on a digital signal processor, it is based on an integration method (the trapezoidal rule) that was developed for polynomials, not oscillatory signals. Using the trapezoidal rule to integrate an acceleration signal results in position values that are independent of spectral information derived from an accelerometer signal. Neglecting the spectral information of an accelerometer signal results in a prediction equation such as that shown as expression (2), where the coefficient preceding each term is a constant. Expression (2), for example, has the constant coefficients:

$$2, -1, \frac{1}{4}, \frac{1}{2}, \frac{1}{4}.$$

Figure 1:
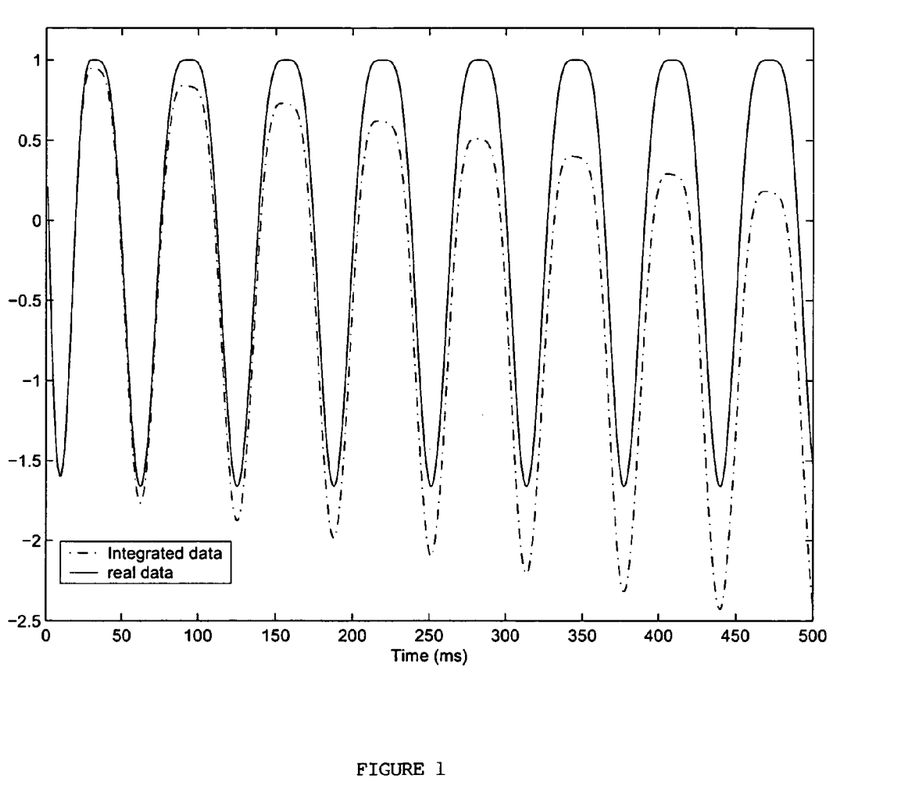
FIG. 1 is a plot of experimentally determined values and predicted values determined according to the method of the prior for a first time period.
Figure 2:
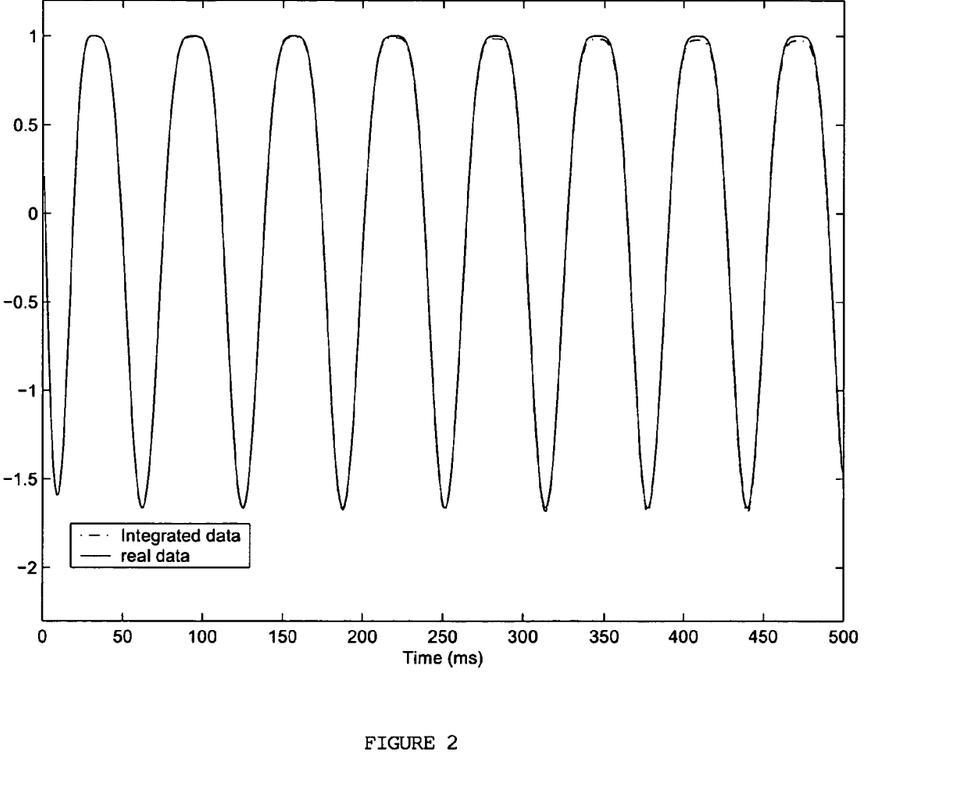
FIG. 2 is a plot of experimentally determined values and predicted values determined according to the method of the prior for an extended time period.

Using constant coefficients that are independent of the spectral information of the accelerometer signal causes the predicted function values to significantly deviate from the actual position values as shown in FIG. 1. This deviation is compounded for extended time periods as shown in FIG. 2.

The use of an error function to determine coefficients that reduce the divergence from the actual position explained above has been proposed in A. Sard, "Best Approximate Integration Formulas: Best Approximation Formulas," *Amer. J. Math.*, vol. 71, no. 1, pp. 80–91, 1949. Although the coefficients determined according to this publication may mitigate the amount of error in the calculated position values, these coefficients are also not based on the spectral content of a source signal.

Similarly, while the following two publications: R. B. Barrar et al., "Optimal Integration Formulas for Analytic Functions," *Bull. Amer. Math. Soc.*, vol. 79, pp. 1296–1298, 1973; and M. D. Stern, "Optimal Quadrature Formulae," *Comput. J.*, vol. 9, pp. 73–88, 1997, suggest methods including the minimization of an error integral, the methods are independent of spectral content, and they do not disclose the calculation of integration coefficients.

Accordingly, there is a need in the art for a robust method and system for determining current and future function values from past function values and past and current second-derivative values. The method and system should determine the current and future function values from at least a frequency of the second-derivative value of the function, and should minimize the deviation from the actual current and future function values over extended periods of time.

SUMMARY OF THE INVENTION

It is an objective of the invention to minimize the amount of error introduced in determining a predicted function value from second-derivative values of the function. The present invention achieves these and other objectives by providing a system for determining a predicted value of a function from at least one previous value of said function and at least one second-derivative value of said function. The system includes a sensor provided to sense a second-derivative value of the function and transmit an oscillatory signal representing the sensed second-derivative value, a computer-readable memory in communication with the sensor to store the previous value of the function and the second-derivative value, and means for computing the predicted value of the function using an integration algorithm including a coefficient of integration that is dependant upon at least a frequency of the signal.

In accordance with another aspect, the present invention provides a method for calculating a predicted function value x(t) from at least one previous function value x(t−mT) and at least one second-derivative value x"(t−nT) of the function. The method includes the steps of sensing one or more second-derivative values x"(t−nT) of the function and transmitting a signal representing the sensed second-derivative values x"(t−nT), wherein each second-derivative value x"(t−nT) is obtained at a unique time; storing each of the second-derivative values x"(t−nT) and the function values x(t), x(t−mT) in a computer-readable memory; selecting an upper-limit frequency W; solving for integration coefficients to be used in the function by minimizing the integral:

$$\frac{1}{2T}\int_{-2TW}^{2TW}\left|1-\left(\sum_{m=1}^{M}c_k^{(0)}e^{-i\pi nu}+\pi^2\sum_{n=0}^{N}c_n^{(2)}(-u^2)e^{-i\pi nu}\right)\right|^2 du$$

wherein the function is expressed as:

$$x(t)=\sum_{m=1}^{M}c_m^{(0)}x(t-mT)+T^2\sum_{n=0}^{N}c_n^{(2)}x''(t-nT)$$

wherein the integration coefficients $c_p^{(b)}$ modify the $p^{th}$ term of the $b^{th}$ derivative, and further wherein t is a time value, T is a sampling period, N is a number of second-derivative values sensed, M is a number of previous function values, n is an integer within a range of from 0 to N, and m is an integer within a range of from 1 to M.

In accordance with yet another aspect, the present invention provides a method for calculating a predicted function value x[n] from at least one previous function value x[n−m] and at least one second-derivative value x"[n−h] of the function. The method comprises the steps of sensing one or more second-derivative values x"[n−h] of the function and transmitting a signal representing the sensed second-derivative values x"[n−h], wherein each second-derivative value x"[n−h] is obtained at a unique time; storing each of the second-derivative values x"[n−h] and the function values x[n], x[n−m] in a computer-readable memory; selecting an upper-limit frequency W; and solving for integration coefficients to be used in said function by minimizing the integral:

$$\frac{1}{2T}\int_{-2TW}^{2TW}\left|1-\left(\sum_{m=1}^{M}c_m^{(0)}e^{-i\pi mu}+\pi^2\sum_{n=h}^{H}c_h^{(2)}(-u^2)e^{-i\pi hu}\right)\right|^2 du.$$

The function is expressed as:

$$x[n]=\sum_{m=1}^{M}c_m^{(0)}x[n-m]+T^2\sum_{h=0}^{H}c_h^{(2)}x''[n-h]$$

wherein the integration coefficients $c_p^{(b)}$ modify the $p^{th}$ term of the $b^{th}$ derivative, further wherein: n is a discrete digital time; T is a sampling period; H is a number of second-derivative values sensed; M is a number of previous function values; h is an integer within a range of from 0 to H; and m is an integer within a range from 1 to M.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTIONS OF AN ILLUSTRATIVE EMBODIMENT

Certain terminology is used herein for convenience only and is not to be taken as a limitation on the present invention. Further, in the drawings, certain features may be shown in somewhat schematic form.

The present invention includes a system and method for the calculation of a predicted function value from a function value and a second-derivative value of the function that occurred earlier in time, along with a second-derivative value occurring at a time when the predicted function value is determined. To clearly describe the present invention, however, the example of predicting the position of a mannequin's chest during chest compressions with accelerometer data will be described in detail. According to this illustrative example, the predicted value represents the chest position of the mannequin and the second-derivative value represents acceleration of the mannequin's chest during chest compressions. During chest compressions, the mannequin's chest is repeatedly forced inward toward the internal cavity of the mannequin and outward away from the internal cavity. This cyclical compression of the mannequin's chest subjects it to acceleration that oscillates between positive and negative values. Likewise, the position of the mannequin's chest is varied in an oscillatory fashion between the inward and outward positions. This example is merely illustrative, and is not intended to be an exhaustive list of all possible systems of the present invention. Further, portions of this disclosure compare the results of the present invention to the results obtained by the method of Aase et al. discussed above, which uses the trapezoidal rule to integrate the accelerometer data.

Figure 3:
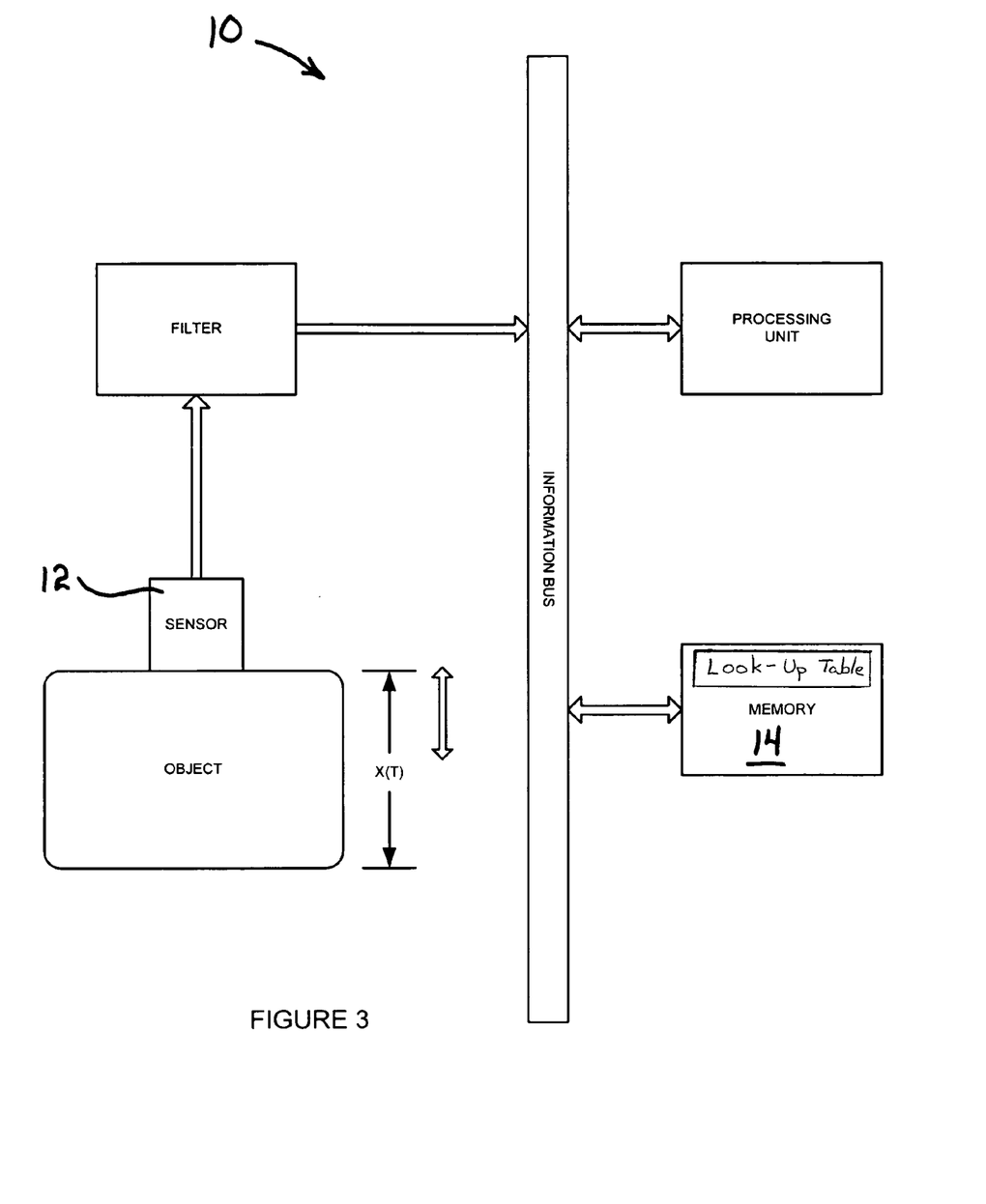
FIG. 3 shows an illustrative arrangement of a system according to the present invention.

The system 10 of the illustrative embodiment of the present invention is shown in FIG. 3 and includes a sensor 12, such as a digital accelerometer, which transmits signals to be recorded in a computer readable memory 14. The signal communicates second-derivative values representing the acceleration experienced by the chest of the mannequin to which the accelerometer is provided. A second-derivative value is a value of the second derivative of a function used to determine predicted values at a time t. According to the illustrative embodiment, the second-derivative values are values of the second derivative of the function from which predicted values of the mannequin's chest position can be determined. The signal can be used to communicate the acceleration values to other portions of the system. For the present case where the acceleration experienced by the object is oscillatory, e.g., the repeated chest compressions performed on the mannequin, the spectral content of the oscillatory signal transmitted by the accelerometer can be found within a range of frequencies, or a bandwidth. An optional filter can be provided to remove unwanted spectral content and electromagnetic noise from the oscillatory signal transmitted by the accelerometer. When a low-pass, band-pass, high-pass and any other type of filter is used to filter the oscillatory signal, the cutoff frequency of the filter can be used as the upper-limit frequency W of the range of frequencies considered in the method of the present invention as discussed below. If the upper-limit frequency W of the acceleration signal is known, then that upper-limit frequency W can be specified directly without requiring filtration to establish the upper-limit frequency.

Other conventional hardware is provided to permit the proper operation of the system. For example, a computer-readable memory such as a RAM, ROM, hard disk, and the like is provided in communication with the accelerometer to store information conveyed by the signal as well as predicted function values, computer readable instructions referred to as logic, and any other electronic data and information necessary for implementation of the system. A look-up table including previously-determined coefficients can be stored within the computer-readable memory to eliminate the need to recalculate coefficients for each operation of the system. For example, a system equipped with an accelerometer having a fixed sampling period T and transmitting a signal having a fixed upper-limit frequency W will not need to periodically recalculate the coefficients, which will not change in this example. Instead, the coefficients for a given sampling period T and upper-limit frequency W can be stored in the look-up table and retrieved as needed by the system to minimize the computational demands on the system. A digital signal processor ("DSP") and/or other processing unit performs the required operations and manipulates the information transmitted by the accelerometer and that in the computer-readable memory as dictated by the logic and algorithms of the present invention.

The method of the present invention can be used to determine a predicted position value of the mannequin's chest from the digital accelerometer signal, which oscillates at a frequency within a known range of frequencies. Thus, information about the spectrum of the accelerometer signal is not ignored by the system and method of the present invention as it is for conventional polynomial-based systems and methods. Although the method is general, it is illustrated for the type of data needed for difference equation (3), which is a corrected variation of difference equation (2) derived according to the conventional approach for the administration of CPR. A position of the mannequin's chest will be predicted using two previously predicted position values and a current and two previously sensed acceleration samples with a digital-time-domain function of the form:

$$x[n]=c_1^{(0)}x[n-1]+c_2^{(0)}x[n-2]+T^2(c_0^{(2)}a[n]+c_1^{(2)}a[n-1]+c_2^{(2)}a[n-2]) \quad (3a)$$

which can be expressed more generally as:

$$x[n] = \sum_{m=1}^{M} c_m^{(0)} x[n-m] + T^2 \sum_{h=0}^{H} c_h^{(2)} x''[n-h] \quad (3b)$$

Rewriting the difference equation (3a) in a continuous time domain results in a function of the form:

$$x(t) = c_1^{(0)} x(t-T) + c_2^{(0)} x(t-2T) + T^2 \sum_{h=0}^{H} c_h^{(2)} x''(t-hT) \quad (4)$$

which can be expressed more generally as:

$$x(t) = \sum_{m=1}^{M} c_m^{(0)} x(t-mT) + T^2 \sum_{h=0}^{H} c_h^{(2)} x''(t-hT) \quad (5)$$

where the terms $c_h^{(b)}$ represent the $p^{th}$ integration coefficient associated with a term of the $b^{th}$ derivative; t is a continuous-time value; n is a discrete digital-time value; T is a sampling period of the accelerometer; H is a number of sensed acceleration value samples; M is a number of previous function values; m and h are numerical values, wherein m and h are positive integers in expressions (3a) and (3b) and any positive numerical value in expressions (4) and (5); x(t) and x[n] represent predicted function values predicted at continuous time t and discrete digital time n, respectively; and x''(t−nT) and x''[n−h] are second derivatives of the functions x(t) and x[n], respectively, taken with respect to time t and n, respectively. For the illustrative embodiment, expressions (4) and (5) will be discussed with M and H both set equal to 2. Although this discussion is focused on the determination of coefficients $c_p^{(b)}$ for the continuous-time domain expressions (4) and (5), the method of the present invention is also applicable to the determination of the coefficients $c_p^{(b)}$ for the discrete digital-time domain expressions (3a) and (3b). As used herein, the term "previous", when used to modify function or second-derivative values, means function or second-derivative values that were determined at a time before the time at which the function value is to be predicted. For example, the predicted function value x(t1) is the value of the function predicted at time t1. A previous function value for this example would be a function value determined at any time t such that t<t1. Function or second-derivative values referred to as "current" values are those values determined at the same time at which predicted function value is to be determined. Going back to the preceding example where the predicted function value occurred at t=t1, a current second-derivative value would be a second derivative x"(t1), which is also determined at (t−hT)=t1. Further, the term "predicted" does not necessarily require the predicted function value to occur in the future. Instead, a predicted function value can be a function value determined at the present time.

Those of ordinary skill in the art will recognize that equations (4) and (5) are the same equation, with equation (5) representing the general form of the continuous-time domain function used according to the present invention. It will also be shown below that the present method reduces this equation to that derived by using the trapezoidal rule when the accelerometer signal is a non-oscillatory signal. Preferably, however, the present method is a digital signal processing method for oscillatory signals whose spectrum is contained in some known frequency band. Inclusion of this spectral information leads to a more accurate and stable technique for predicting function values for an oscillatory function.

The method of the present invention includes determining the best coefficients $c_p^{(b)}$ for difference equations (4) and (5) to obtain current position from past position and current and past acceleration samples. Although this method is developed and illustrated for the chest-compression example, it can be adapted for other combinations of samples.

Determination of the coefficients as a function of at least the highest frequency of the accelerometer signal minimizes error in the predicted function value. Consideration of the spectral information of the digital accelerometer signal and the corresponding Fourier representation of position leads to a linear system for the optimal coefficients in the difference equation. For purposes of illustration, it is assumed that the signal of acceleration readings is band-limited by an upper limit, or cutoff frequency W. The resulting linear system involves sinc functions and derivatives of sinc functions. If the underlying spectrum of the acceleration signal made it a bandpass signal, for example, the resulting system would involve sinc functions adjusted by a modulating factor.

Determining the optimal coefficients $c_p^{(b)}$ in difference equations (4) and (5) is accomplished through error minimization. To determine a bound on the error in the approximation, the integral representation of the signal is substituted into difference equation (4). The integral representation of the signal can be expressed as:

$$x(t) = \int_{-W}^{W} X(f)e^{2\pi itf} df \quad (6)$$

Limiting the integral in (6) to a frequency interval [−W,W] and substituting this expression into difference equation (4) makes use of the upper-limit, or band limit, imposed on the accelerometer signal as discussed above. Again, this upper-limit frequency W can optionally be established as the cutoff frequency of a filter used to filter the accelerometer signal, but in any event, the upper-limit frequency W should be established so that the frequency interval [0,W] contains the spectrum of the signal. Using the Cauchy-Schwarz inequality, it can be shown that the error, which is found from a function of the form:

$$E = \left| x(t) - \left( \sum_{k=1}^{M} c_k^{(0)} x(t-kT) + T^2 \sum_{h=0}^{H} c_h^{(2)} x''(t-hT) \right) \right|^2 \quad (7)$$

is bounded by:

$$\varepsilon \leq \|x\|_2^2 \cdot \varepsilon_1$$

where:

$$\varepsilon_1 = \frac{1}{2\pi} \int_{-\tau}^{\tau} |S(u)|^2 du \quad (8)$$

with $\tau = 2TW$ and:

$$S(u) = 1 - \left( \sum_{k=1}^{M} c_k^{(0)} e^{-ikTu} + \pi^2 \sum_{h=0}^{H} c_h^{(2)} (-u^2) e^{-ihTu} \right) \quad (9)$$

Error minimization according to the present invention is accomplished by minimizing error integral (8). The kernel of expression (9) can vary depending on the location of the particular samples involved in the difference equation. Such variations are within the ability of those skilled in the art and are thus, within the scope of the present invention.

Typically, error estimates for integrals using conventional Newton-Cotes formulas involve derivatives of the function. In contrast, absolute error introduced by the method of the present invention (i.e., the difference between the actual position of the mannequin's chest and the predicted value of the function of the illustrative embodiment) is bounded by the product of the square root of the signal's energy and the quantity $\epsilon_1$ determined according to expression (8). Determining the absolute error in this manner can be facilitated with an estimated value of the signal's energy instead of requiring a known value of the signal's energy.

Minimizing the integral error $\epsilon_1$ in (8) with respect to the unknown coefficients $c_p^{(b)}$ leads to a set of equations that the optimal coefficients in the difference equation (3) must satisfy. The following definitions are established to simplify the resulting system of equations:

$$s(t) = \operatorname{sinc}(t) \quad (10)$$

$$s_2(t) = -\tau^2 \frac{d^2}{dt^2} \operatorname{sinc}(t) = -\tau^2 \frac{d^2}{dt^2} s(t) \quad (11)$$

$$s_4(t) = -\tau^4 \frac{d^4}{dt^4} \operatorname{sinc}(t) = -\tau^4 \frac{d^4}{dt^4} s(t) \quad (12)$$

wherein the sinc function is defined as:

$$\text{sinc}(\pi t) = \frac{\sin(\pi t)}{\pi t}$$

To minimize the integral error $\epsilon_1$, expression (8) is differentiated with respect to each of the coefficients $c_p^{(b)}$ and each derivative is set equal to zero. Terms such as:

$$\int_{-\tau}^{\tau} e^{i\pi ku} du$$

result from the systematic differentiation, which is a multiple of the function $\text{sinc}(\pi k\tau)$ and is a reason that the sinc function and its derivatives are important to the present method. Since the actual calculations are well known a detailed description is omitted.

Written out as a matrix system of equations, the difference equation coefficients are obtained by solving the system:

$$\begin{bmatrix} s(0) & s(\tau) & s_2(\tau) & s_2(0) & s_2(\tau) \\ s(\tau) & s(0) & s_2(2\tau) & s_2(\tau) & s_2(0) \\ s_2(\tau) & s_2(2\tau) & s_4(0) & s_4(\tau) & s_4(2\tau) \\ s_2(0) & s_2(\tau) & s_4(\tau) & s_4(\tau) & s_4(\tau) \\ s_2(\tau) & s_2(0) & s_4(2\tau) & s_4(2\tau) & s_4(0) \end{bmatrix} \begin{bmatrix} c_1^{(0)} \\ c_2^{(0)} \\ c_0^{(2)} \\ c_1^{(2)} \\ c_2^{(2)} \end{bmatrix} = \begin{bmatrix} s(\tau) \\ s(2\tau) \\ s_2(0) \\ s_2(\tau) \\ s_2(2\tau) \end{bmatrix} \quad (13)$$

for the coefficients $c_p^{(b)}$. The system matrix in (13) is not close to singular, except for values of $\tau$ that are close to zero, so that the system may be solved for the integration coefficients $c_p^{(b)}$ in expressions (4) and (5) by standard matrix methods.

Note that the difference equation coefficients are independent of the particular signal, and depend on the frequency spectrum of the signal. The coefficients $c_p^{(b)}$ for the difference equations (4) and (5) are determined from the above matrix system based primarily on the value of $\tau$, which is determined once the sampling period T is chosen and a bound for the highest frequency W is known. Just as in applying the Nyquist criterion for signal reconstruction, the sampling period T must be chosen so that aliasing will not occur. Generally, aliasing is the condition that occurs when samples are not taken frequently enough to accurately reflect the signal being sampled. When aliasing occurs, artifacts are introduced into the reconstructed signal. Thus, the sampling period T must be sufficiently small to sample the signal of the accelerometer frequently enough to provide a reasonable reconstruction of the signal. The illustrative embodiment of the present invention can be readily adapted to determine a linear system for difference equation coefficients that are based on different temporal locations of the acceleration values sensed by the accelerometer, as a distinct pattern is evident in the linear system in the way that it depends on those values.

The system matrix in (13) is nonsingular for values of $\tau$ bounded away from zero, so the solution of the system in (13) can be found by standard matrix methods. For very small values of $\tau$, however, where the underlying signal is a polynomial, care must be taken in solving the system, as the system matrix becomes singular. A singular matrix, as used herein, means a matrix whose determinant is equal to zero, and which therefore cannot be inverted.

General Experimental

A comparison between position values predicted according to the present invention and those predicted according to the conventional method using the trapezoidal rule is provided to illustrate at least some of the advantages of the present invention. Further, this section provides a discussion of potential applications based on the error minimization method to determine position from acceleration samples.

For the chest compression example discussed in the Aase et al. publication, it was observed that the integration method using the time domain equivalent of expression (2) based on the trapezoidal rule was not stable, as is clear from the plot shown in FIG. 1. FIG. 1 illustrates the significant deviation of the predicted position values from actual position values for a time period of 500 msec. Aase et al. opined that a solution to this problem was to reset the integration, in effect, "switching" the integration off and restarting it again at specified intervals.

For comparison, FIG. 2 shows a plot of position values predicted with expression (4) including the integration coefficients found by solving matrix system (13) over the same 500 msec. time period and using the same data. The error minimization method of the present invention always employs the information that the underlying acceleration signal has a known frequency band. Due to this minimization of error for oscillatory signals there is no need to repeatedly activate and deactivate the signal.

Figure 4:
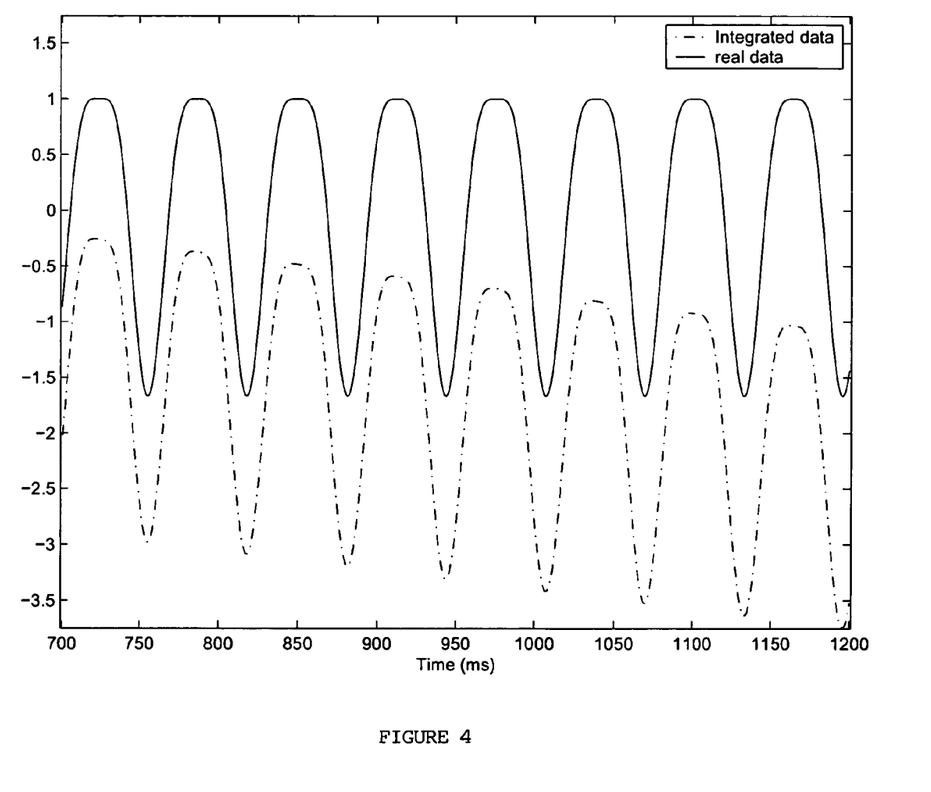
FIG. 4 is a plot of experimentally determined values and predicted values determined according to the method and systems of the present invention for the first time period displayed in FIG. 1.
Figure 5:
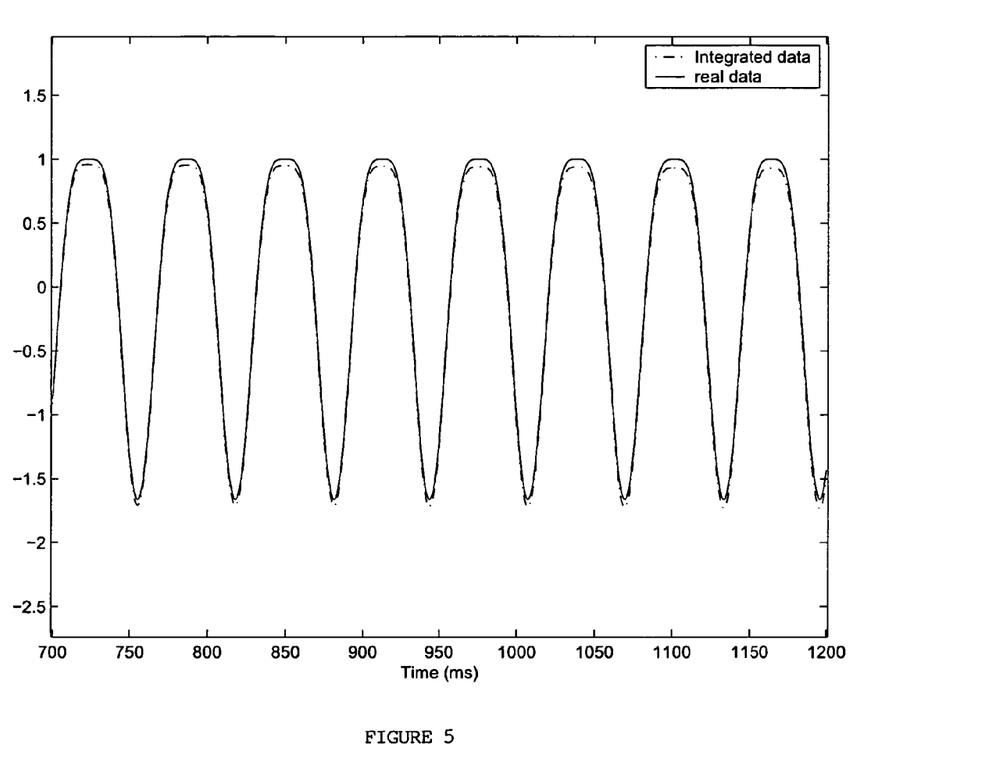
FIG. 5 is a plot of experimentally determined values and predicted values determined according to the method and systems of the present invention for the extended time period displayed in FIG. 2.

To tests the results illustrated in FIGS. 1 and 2 even further, the respective methods were applied over an extended time interval, continuing the time period beyond the initial $0 \leq t \leq 500$ msec. time interval that was used in FIGS. 1 and 2. FIG. 4 illustrates a comparison between position values predicted with the trapezoidal-based rule of the prior art and actual position values over an extended time period of $700 \leq t \leq 1200$ msec. Similarly, FIG. 5 illustrates a comparison between position values predicted with the error-minimization method of the present invention and actual position values over the same extended time period. It can be seen that the solution computed using error minimization remains substantially stable even during this extended period, while the trapezoidal-rule solution continues to deviate further from the actual values.

EXAMPLE

This example is provided merely to illustrate an implementation of the present invention along side the conventional system and method disclosed in Aase et al. Neither the Example nor the General Experimental should be considered to limit the present invention as recited in the claims.

The data collected from the experimental arrangement outlined in Aase et al. is used to predict integration coefficients according to the method of the present invention. To collect this data, chest compressions were delivered on a standard Skillmeter mannequin manufactured by Laerdal Medical. This mannequin was provided with a linear chest compression sensor, formed by an internal pivot acting on a potentiometer. The analog potentiometer signal was made available for a measurement system and was the reference for the accelerometer based compression depth estimates.

An ADXL202 accelerometer manufactured by Analog Devices of Cambridge, Mass. along with a membrane switch manufactured by Keytouch of Horton, Norway formed the chest compression sensor. The switch was arranged to be activated by the pressure from the rescuer's hands when chest compression begins. A baseplate was secured on top of the mannequin's chest with screws, forming a horizontal surface on which the compression sensor was fixed with adhesive tape.

A second accelerometer, which acted as a reference sensor, was put on the floor next to the mannequin. The analog output from each sensor was used with the bandwidth set from direct current to 20 Hz using a resistance-capacitance (RC) network.

The signal from the two accelerometers, the membrane switch, and the mannequin potentiometer were sampled at 1000 Hz using a PCMCIA data card, a DAQ CARD manufactured by National Instruments, operatively connected to a Compaq Armada 7770 laptop computer. Analog-to-digital conversion gave a resolution of approximately 4.9 mm/sec$^2$ for acceleration and 2.6 μm for vertical displacement of the mannequin chest, without considering noise effects on resolution. For each accelerometer output, the anti-aliasing RC filter gave 35-dB attenuation at 500 Hz.

With the system in place and the mannequin lying on floor, CPR was performed with two inflations of the lungs between a series of 15 chest compressions. Chest compressions were delivered in a manner that included variations in depth, rate and duty cycle. The duty cycle was 20%–50%; chest compression rate was 60/min–138/min; and compression depth was 2 cm–5 cm. A total of 239 compressions were delivered.

Data collected by this exemplary system was used to arrive at digital-time-domain expression (2) in Aase et al. It can be observed from expression (2) that the coefficients preceding each term therein are:

$$2, -1, \frac{1}{4}, \frac{1}{2}, \frac{1}{4} \tag{14}$$

These terms correspond to coefficients $c_1^{(0)}$, $c_2^{(0)}$, $c_0^{(2)}$, $c_1^{(2)}$, and $c_2^{(2)}$, respectively, for expression (2).

The same data that was used above with the conventional trapezoidal rule to arrive at the coefficients in expression (14) was then used to determine the integration coefficients according to the present invention. With τ=0.032, the integration coefficients $c_p^{(b)}$ in expression (3) were determined using matrix system (13) according to the method of the present invention to be:

$$2, -1, 0.083724, 0.832560\ 0.083724 \tag{15}$$

Again, these coefficients are listed in the order $c_1^{(0)}$, $c_2^{(0)}$, $c_0^{(2)}$, $c_1^{(2)}$, and $c_2^{(2)}$, respectively, and shown with five significant digits.

In addition to calculating integration coefficients that suitably predict position values from an oscillatory signal, the present invention additionally produces coefficients which approach those determined using a standard Newton-Cotes rule as τ approaches zero (i.e., a non-oscillatory signal having zero frequency). For example, repeating the calculations that lead to the integration coefficients in expression (15) with τ=0.014, the new coefficients are $$2, -1, 0.083388, 0.83322, 0.083388 \tag{16}$$

From the above description of the invention, those skilled in the art will perceive improvements, changes and modifications. Such improvements, changes and modifications within the skill of the art are intended to be covered by the appended claims.

What is claimed is:

1. A system for determining a predicted value of a function from at least one previous value of the function and at least one second-derivative value of the function, the system comprising:

a sensor provided to sense a second-derivative value of the function and transmit an oscillatory signal representing the sensed second-derivative value;

a computer-readable memory in communication with the sensor to store the previous value of the function and the second-derivative value; and means for computing the predicted value of the function using an integration algorithm including a coefficient of integration that is dependant upon at least a frequency of the signal, wherein the predicted value of the function is a position value and the second-derivative value of the function is an acceleration value and the function is expressed as:

$$x(t) = \sum_{m=1}^{M} c_m^{(0)} x(t - mT) + T^2 \sum_{h=0}^{H} c_h^{(2)} x''(t - hT)$$

wherein the terms expressed generally as $c_p^{(b)}$ represent the $p^{th}$ coefficient associated with a term of the $b^{th}$ derivative, T is a sampling period, H equals the number of previous second-derivative values sensed, M is a number of previous function values, h is a numerical value within a range of from 0 to H, m is a numerical value within a range of from 1 to M, x(t) is the predicted value of the function at time t, and x''(t–hT) represents a second derivative of the function taken with respect to time and evaluated at time t–hT.

2. The system according to claim 1, wherein the coefficient of integration is determined from at least the frequency of the signal and a sampling period of the sensor.

3. The system according to claim 1 further comprising a filter to remove a portion of the signal that exists at a predetermined frequency range.

4. The system according to claim 3, wherein the frequency of the signal used to determine the coefficient of integration is a cutoff frequency of the filter.

5. The system according to claim 1, wherein the coefficients $c_p^{(b)}$ that will produce a minimal amount of error minimize a value of the integral:

$$\frac{1}{2T} \int_{-2TW}^{2TW} \left| 1 - \left( \sum_{k=1}^{M} c_k^{(0)} e^{-i\pi ku} + \pi^2 \sum_{h=0}^{H} c_h^{(2)} (-u^2) e^{-i\pi hu} \right) \right|^2 du$$

wherein, W is an upper-limit frequency of the signal transmitted by the sensor, and k is an integer from 1 to M.

6. The system according to claim 5, wherein the coefficients are computed from a linear system of the form:

$$\begin{bmatrix} s(0) & s(\tau) & s_2(\tau) & s_2(0) & s_2(\tau) \\ s(\tau) & s(0) & s_2(2\tau) & s_2(\tau) & s_2(0) \\ s_2(\tau) & s_2(2\tau) & s_4(0) & s_4(\tau) & s_4(2\tau) \\ s_2(0) & s_2(\tau) & s_4(\tau) & s_4(\tau) & s_4(\tau) \\ s_2(\tau) & s_2(0) & s_4(2\tau) & s_4(2\tau) & s_4(0) \end{bmatrix} \begin{bmatrix} c_1^{(0)} \\ c_2^{(0)} \\ c_0^{(2)} \\ c_1^{(2)} \\ c_2^{(2)} \end{bmatrix} = \begin{bmatrix} s(\tau) \\ s(2\tau) \\ s_2(0) \\ s_2(\tau) \\ s_2(2\tau) \end{bmatrix}$$

wherein $s(\tau) = \mathrm{sinc}(\tau)$ $s_2(\tau) = -\tau^2 s''(\tau)$ $s_4(\tau) = -\tau^4 s^{(4)}(\tau)$ further wherein $\tau=2TW$, and the parenthetical superscript represents a derivative number.

7. The system according to claim 1, wherein the signal transmitted by the sensor is converted to a digital signal.

8. The system according to claim 7, wherein the means for computing the current value of the function comprises a digital-signal processor controlled by computer-readable instructions adapted to compute the predicted value of the function.

9. The system according to claim 7, wherein the function is expressed as:

$$x[n] = \sum_{m=1}^{M} c_m^{(0)} x[n-m] + T^2 \sum_{h=0}^{H} c_h^{(2)} x''[n-h]$$

wherein the terms expressed generally as $c_p^{(b)}$ represent the $p^{th}$ coefficient associated with a term of the $b^{th}$ derivative, T is a sampling period, H=the number of previous second-derivative values sensed, M is a number of previous function values, n is a discrete digital time operator, m is an integer within a range of from 1 to M, x[n] is the predicted discrete value of the digital-time-domain function at n, and x"[n–h] represents a second derivative of the function taken with respect to n and evaluated at time t–hT.

10. A method for calculating a predicted function value x(t) from at least one previous function value x(t–mT) and at least one second-derivative value x"(t–hT) of the function, the method comprising the steps of:
   sensing one or more second-derivative values x"(t–hT) of the function and transmitting a signal representing the sensed second-derivative values x"(t–hT), wherein each second-derivative value x"(t–hT) is obtained at a unique time;
   storing each of the second-derivative values x"(t–hT), and the function values x(t) and x(t–mT) in a computer-readable memory;
   selecting an upper-limit frequency W; and
   solving for integration coefficients to be used in the function by minimizing the integral:

$$\frac{1}{2T} \int_{-2TW}^{2TW} \left| 1 - \left( \sum_{m=1}^{M} c_k^{(0)} e^{-i\pi mu} + \pi^2 \sum_{n=h}^{H} c_n^{(2)} (-u^2) e^{-i\pi hu} \right) \right|^2 du$$

wherein the function is expressed as:

$$x(t) = \sum_{m=1}^{M} c_m^{(0)} x(t-mT) + T^2 \sum_{h=0}^{H} c_n^{(2)} x''(t-hT)$$

wherein the integration coefficients $c_p^{(b)}$ modify the $p^{th}$ term of the $b^{th}$ derivative, further wherein:
   t is a time value;
   T is a sampling period;
   H is a number of second-derivative values sensed;
   M is a number of previous function values;
   h is a numerical value within a range of from 0 to H; and
   m is a numerical value within a range from 1 to M.

11. The method according to claim 10, wherein the solving for coefficients step comprises solving a linear system of equations of the form:

$$\begin{bmatrix} s(0) & s(\tau) & s_2(\tau) & s_2(0) & s_2(\tau) \\ s(\tau) & s(0) & s_2(2\tau) & s_2(\tau) & s_2(0) \\ s_2(\tau) & s_2(2\tau) & s_4(0) & s_4(\tau) & s_4(2\tau) \\ s_2(0) & s_2(\tau) & s_4(\tau) & s_4(\tau) & s_4(\tau) \\ s_2(\tau) & s_2(0) & s_4(2\tau) & s_4(2\tau) & s_4(0) \end{bmatrix} \begin{bmatrix} c_1^{(0)} \\ c_2^{(0)} \\ c_0^{(2)} \\ c_1^{(2)} \\ c_2^{(2)} \end{bmatrix} = \begin{bmatrix} s(\tau) \\ s(2\tau) \\ s_2(0) \\ s_2(\tau) \\ s_2(2\tau) \end{bmatrix}$$

wherein $s(\tau) = \mathrm{sinc}(\tau)$ $s_2(\tau) = -\tau^2 s''(\tau)$ $s_4(\tau) = -\tau^4 s^{(4)}(\tau)$ $\tau = 2TW$ and the parenthetical superscript represents a derivative.

12. The method according to claim 10, wherein the predicted function value x(t) is a position value and the second-derivative value x"(t–hT) of the function is an acceleration value.

13. The method according to claim 10, wherein the step of obtaining an upper-limit frequency W comprises the steps of:
   Filtering the signal representing the sensed second-derivative values x"(t–hT) with a filter; and
   assigning a cutoff frequency of the filter as the upper-limit frequency W.

14. The method according to claim 13, wherein the step of filtering the signal comprises the step of filtering the signal with at least one of a low-pass filter, a band-pass filter, a high pass filter.

15. The method according to claim 10, wherein the step of sensing the second-derivative values x"(t–hT) comprises the steps of:
   periodically sensing the second-derivative values x"(t–hT) at regular intervals to establish a generally uniform sampling period T between sensing successive second-derivative values x"(t=hT); and
   sensing the second-derivative values x"(t–hT) at a suitable frequency to minimize aliasing.

16. A method for calculating a predicted function value x[n] from at least one previous function value x[n–m] and at least one second-derivative value x"[n–h] of the function, the method comprising the steps of:
   sensing one or more second-derivative values x"[n–h] of the function and transmitting a signal representing the sensed second-derivative values x"[n–h], wherein each second-derivative value x"[n–h] is obtained at a unique time;

storing each of the second-derivative values x"[n–h], and the function values x[n] and x[n–m] in a computer-readable memory;

selecting an upper-limit frequency W; and solving for integration coefficients to be used in the function by minimizing the integral:

$$\frac{1}{2T}\int_{-2TW}^{2TW}\left|1-\left(\sum_{m=1}^{M}c_m^{(0)}e^{-i\pi mu}+\pi^2\sum_{n=h}^{H}c_h^{(2)}(-u^2)e^{-i\pi hu}\right)\right|^2 du$$

wherein the function is expressed as:

$$x[n]=\sum_{m=1}^{M}c_m^{(0)}x[n-m]+T^2\sum_{h=0}^{H}c_h^{(2)}x''[n-h]$$

wherein the integration coefficients $c_p^{(b)}$ modify the $p^{th}$ term of the $b^{th}$ derivative, further wherein:

n is a discrete digital time;

T is a sampling period;

H is a number of second-derivative values sensed;

M is a number of previous function values;

h is an integer within a range of from 0 to H; and m is an integer within a range from 1 to M.

17. A system for determining a predicted value of a function from at least one previous value of the function and at least one second-derivative value of the function, the system comprising:

a sensor provided to sense a second-derivative value of the function and transmit an oscillatory signal representing the sensed second-derivative value;

a computer-readable memory in communication with the sensor to store the previous value of the function and the second-derivative value; and means for computing the predicted value of the function using an integration algorithm including a coefficient of integration that is dependant upon at least a frequency of the signal, wherein the predicted value of the function is a position value and the second-derivative value of the function is an acceleration value and the function is expressed as:

$$x(t)=\sum_{m=1}^{M}c_m^{(0)}x(t-mT)+T^2\sum_{h=0}^{H}c_h^{(2)}x''(t-hT)$$

wherein the terms expressed generally as $c_p^{(b)}$ represent the $p^{th}$ coefficient associated with a term of the $b^{th}$ derivative, T is a sampling period, H equals the number of previous second-derivative values sensed, M is a number of previous function values, h is a numerical value within a range of from 0 to H, m is a numerical value within a range of from 1 to M, x(t) is the predicted value of the function at time t, and x"(t–hT) represents a second derivative of the function taken with respect to time and evaluated at time t–hT, wherein the signal transmitted by the sensor is converted to a digital signal and the function is expressed as:

$$x[n]=\sum_{m=1}^{M}c_m^{(0)}x[n-m]+T^2\sum_{h=0}^{H}c_h^{(2)}x''[n-h]$$

wherein the terms expressed generally as $c_p^{(b)}$ represent the $p^{th}$ coefficient associated with a term of the $b^{th}$ derivative, T is a sampling period, H equals the number of previous second-derivative values sensed, M is a number of previous function values, n is a discrete digital time operator, m is an integer within a range of from 1 to M, x[n] is the predicted discrete value of the digital-time-domain function at n, and x"[n–h] represents a second derivative of the function taken with respect to n and evaluated at time t–hT.

\* \* \* \* \*